Aug. 7, 1928.  1,679,354
S. M. FAIRCHILD ET AL
GYROSCOPIC CONTROL OF CAMERAS AND OTHER OPTICAL DEVICES
Filed March 1, 1923   3 Sheets-Sheet 1
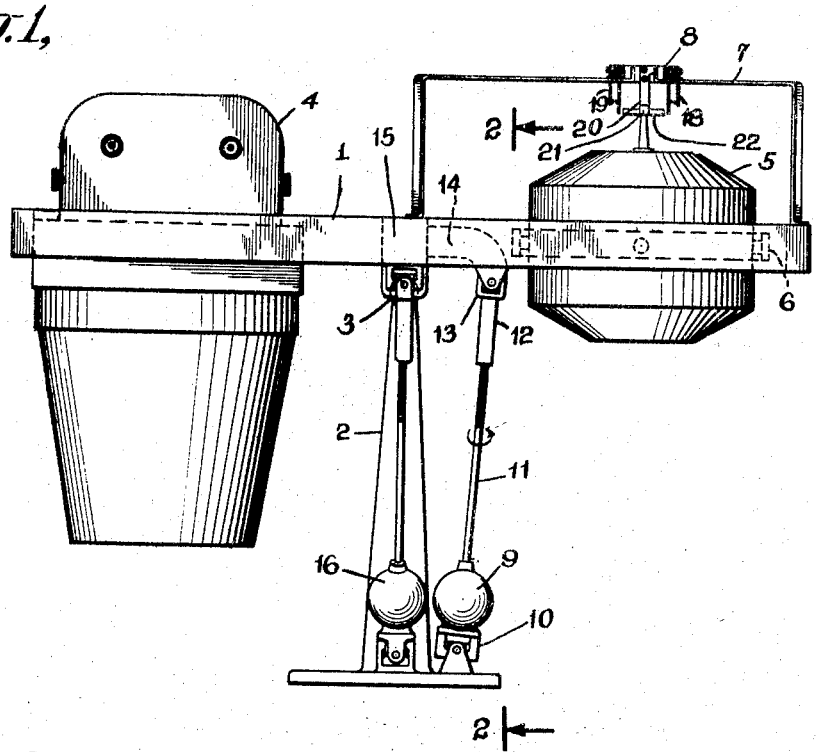
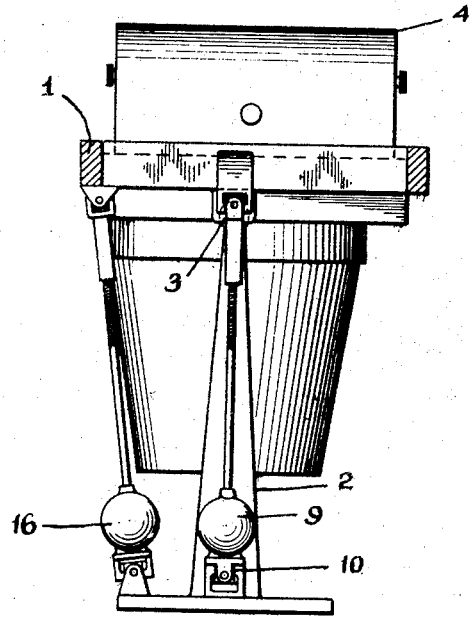
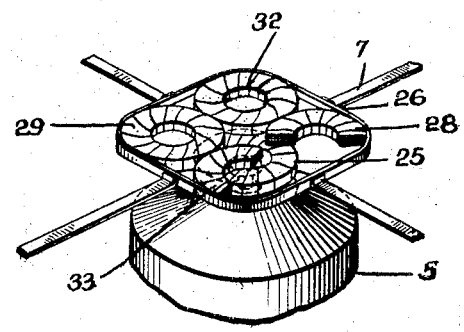
S. M. Fairchild
E. R. Morton
Inventors
By their Attorneys
Cooper, Kerr & Dunham

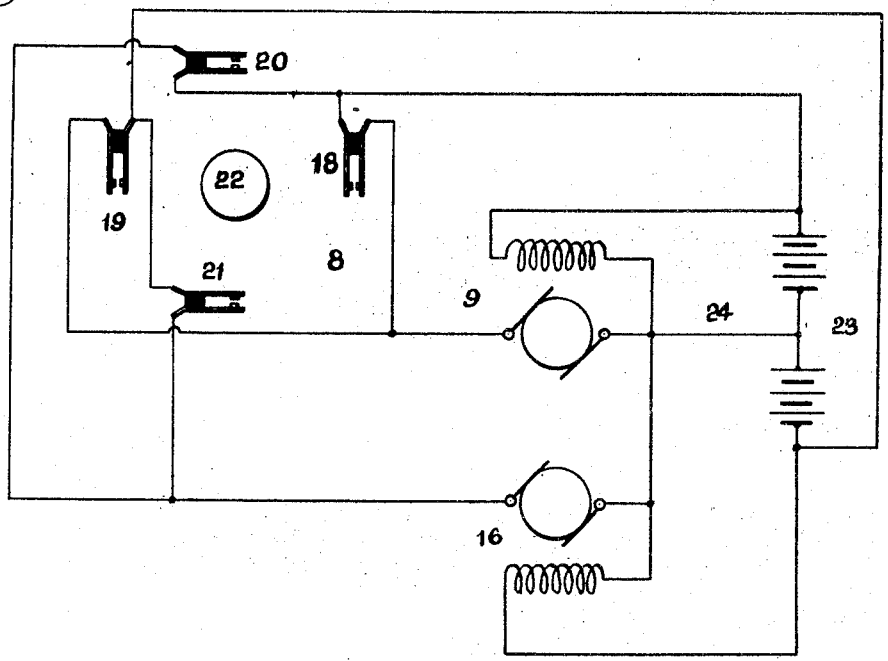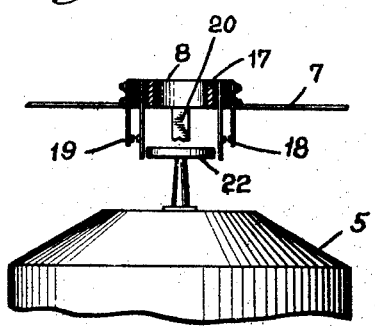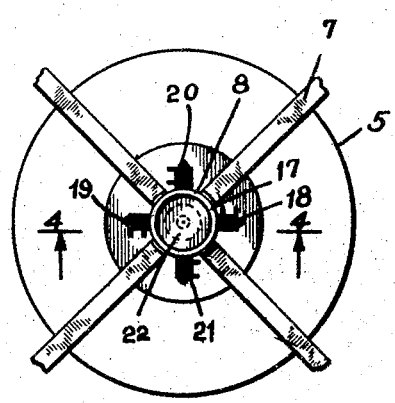

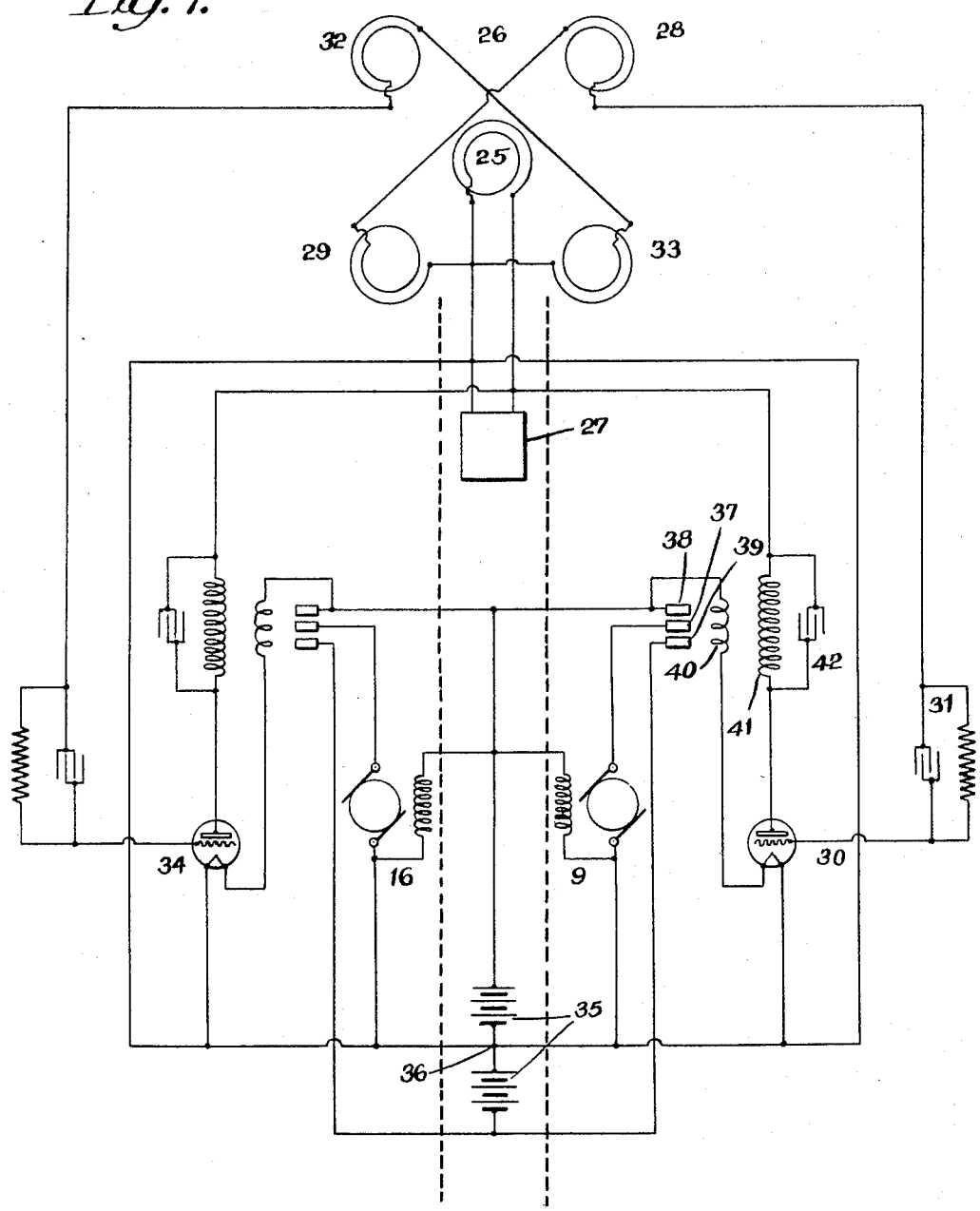

Patented Aug. 7, 1928.

1,679,354

UNITED STATES PATENT OFFICE.

SHERMAN M. FAIRCHILD AND EDMUND R. MORTON, OF NEW YORK, N. Y.; SAID MORTON ASSIGNOR TO SAID FAIRCHILD.

GYROSCOPIC CONTROL OF CAMERAS AND OTHER OPTICAL DEVICES.

Application filed March 1, 1923. Serial No. 622,036.

This invention relates to systems for controlling the orientation of a camera or other optical device in accordance with the position of a gyroscopic stabilizer.

One of the objects of the invention is to provide means whereby a gyroscope can control a camera or other optical device of considerable mass through the action of electrical devices which will relieve the gyroscope of doing the actual work of moving the camera thus preventing the action of external forces from disturbing the equilibrium of the gyroscope and causing its indication of the vertical, if it be of the vertical-indicating type, to be in error.

Our invention includes, in its preferred form, a gyroscope and erecting means therefor, which latter may be of the type described in U. S. Patent No. 1,311,768; an aerial camera or other optical device; means responsive to change in the relative orientation of the gyroscope and the camera; and electrical means for causing the camera to assume a predetermined orientation with respect to the gyroscope, under control of the said responsive means. Various mechanical constructions may be employed for producing the desired predetermined relative orientation, as examples of which we illustrate herein two such constructions, having different advantages and degrees of refinement.

The first construction referred to has the advantage of simplicity but in the functioning of the device slight disturbing forces are applied to the gyroscope, which may in some cases be objectionable.

The second construction shown by way of illustration has more electrical complication but has the advantage for precise work that substantially no disturbing force is impressed on the gyroscope, as will be explained more completely hereinafter.

In the drawings,

Fig. 1 is a side view of a camera and gyroscope equipped with one of our devices.

Fig. 2 is a section along line 2—2 of Fig. 1.

Fig. 3 is a plan view of the contact device shown in Fig. 1.

Fig. 4 is a partial section along line 4—4 of Fig. 3.

Fig. 5 is a wiring diagram of the control system using contacts shown in Figs. 1, 3 and 4.

Fig. 6 is a perspective view, partly in section, of coils used in the second system of control.

Fig. 7 is a diagram of the wiring used with coil control by electric induction, as illustrated in Fig. 6.

Referring to Fig. 1, a frame 1 mounted on post 2 through a universal joint 3 carries an aerial camera 4 rigidly attached to the frame. The camera may be of the automatic type described in copending applications of S. M. Fairchild, or of any other type convenient and desirable to us.

The gyroscope and erector, which may be of the type described in U. S. Patent No. 1,311,768, is diagrammatically illustrated at 5 and is mounted universally on the frame 1 by means of the gimbal frame 6. A supporting frame 7 mounted rigidly on frame 1 carries the receiving element, in this case the contact assembly 8, of the position-responsive device to be described. Fig. 6 shows the frame 7 carrying coils for the second type of electric control mechanism described. The electric motor 9, mounted on the universal joint 10, controls the motion of the frame 1 about an axis perpendicular to the plane of Fig. 1 by means of its shaft 11, threaded at its upper end into the internally threaded sleeve 12 connected to the frame 1 through the universal joint 13 and bracket 14 extending from the middle cross member 15 of frame 1. It will readily be seen then that when the motor shaft 11 rotates, the sleeve 12 will be raised or lowered, rocking the frame 1 and camera 4 an amount depending on the magnitude and direction of the rotation of the shaft 11. The motion of the frame 1 and camera 4 about an axis perpendicular to this, that is, perpendicular to the plane of Fig. 2, is controlled in a precisely similar manner by motor 16.

Figs. 3 and 4 illustrate in greater detail the contact system shown in Fig. 1. As shown, the frame 7 carries a ring 17 having mounted on it four pairs of insulated normally open contacts 18—19—20—21. The insulating disk 22 mounted on the gyroscope 5 permits all the contacts to remain open when the disk 22 is in a central position. Should the frame 1 tilt, however, with respect to the gyro, one or two of the pairs of contacts will be closed, according to whether the disk moves directly against the contacts or diagonally. Closing a contact will start a motor. Referring to Fig. 5, it will be seen that the motors 9 and 16 have their field windings connected continuously in circuit with the battery 23. One side of each of the armatures of the motors 9 and 16 is connected permanently to the neutral tap 24 of the battery 23. The other side of the armature may be connected to the positive terminal of the battery 23 by closing contact 18 or to the negative terminal of the battery 23 by closing contact 19, thereby causing the motor to run in the forward or reverse direction, respectively. Likewise motor 16 may be run in the forward or reverse direction by closing contact 20 or 21.

The complete action of the device will now be explained with reference to Fig. 1. Assume that the frame 1 is tilted to the left (that is, counterclockwise) with respect to the gyro 5, by tilting of the aeroplane or other platform upon which the post 2 is mounted. The insulated disk 22 then presses against contacts 18, closing the circuit through the contacts, the battery 23 of Fig. 5, and the motor 9. The motor 9 now runs in the direction of the arrow, screwing its shaft 11 into the sleeve 12 and thereby shortening the distance between the universal joints 10 and 13, thus causing the frame 1 to swing back toward its proper position with respect to the gyroscope 5. When this proper position is reached the contact 18 opens, the motor 9 stops and the system is at rest, prepared for the next disturbance. Since the action of motor 9 may be made as rapid as desirable, the apparatus can be so designed that the frame 1 can never leave its predetermined relation to the gyroscope by more than a slight angle, depending on the motion of disk 22 required to close contact 18 and approximately equal to this angle. In the case of a long swing, the motor 9 may operate continuously or in a number of quick starts and stops depending on the velocity of the deviation of the aeroplane or other carrier of post 2 from its normal position with respect to the gyroscope 5. Similarly, tilts of the frame 1 in the other direction are corrected by the motor 9 operating in the reverse direction through contact 19. Likewise tilts of the frame 1 relative to the gyroscope 5 about an axis in the plane of the drawing will be corrected independently or simultaneously by motor 16, under the influence of currents through the contacts 20 and 21.

It will be seen then that, under the influence of motors and suitable controlling means, a frame carrying a camera or other optical device may be caused to maintain itself within any reasonable predetermined limits (depending in this case on the mechanical design of the disk 22 and the contact assembly 8) in a predetermined angularly positional relation, about two axes, to a gyroscope or a gyroscope and erector, without the necessity of causing the gyroscope to do the work of moving the frame and optical device, and without applying a force to the gyroscope due to any unbalance of the complete assembly.

This device, however, applies forces to the gyroscope, due to the pressure necessary to close the contacts of the contact assembly 8, which forces increase their moment if the disk 22 and contact assembly 8 are further removed from the axis of rotation of the gyroscope to obtain the greater precision of action attainable with a longer lever arm. This is generally undesirable as for precise work, since in such work any disturbing force exerted on the gyroscope should be made smaller rather than larger. For avoiding such undesirable effects we show the alternative method described hereinafter, which, by reason of the electrical characteristics of the system, applies practically and substantially no disturbing force to the gyroscope.

Referring to Fig. 6, the coil 25 is mounted on the gyroscope (indicated at 5) in place of the insulated disk 22 of Fig. 1, and the assembly of four coils is mounted on the brackets 7 in place of the contact assembly 8, these five coils forming a vario-coupler or variable air-core transformer having a primary and two independent secondaries for use as will be described below.

In Fig. 7 the primary coil 25 is shown connected to an A. C. generator 27 which, if desired, may be of the well known Alexanderson type, and which may conveniently be mounted on the shaft of the gyroscope. The secondaries 28 and 29 of the vario-coupler are connected in opposition to the grid of a thermionic valve or vacuum tube 30 through a grid condenser and leak 31, used for averaging the in-and-out-of-phase components of the potential applied to the grid, with respect to the plate potential. This valve or vacuum tube may be of the type commonly used and well known in the art of radio telephony. Likewise the secondaries 32 and 33 of the vario-coupler are connected in opposition to the grid of a vacuum tube 34. Since the potentials induced in coils 32 and 33 act in precisely the same way in controlling motor 16 as the potentials induced in coils 28 and 29 act in controlling motor 9, it will be sufficient, in general, to explain the control of motor 9.

It will be seen that with coil 25 in its central position no potentials will be induced in either secondary circuit of the vario-coupler, and that if the coil 25 is moved along the center line of either pair of secondary coils, the symmetry and potential balance will be maintained in the latter, but that currents will be induced in the other coils depending, in phase and magnitude, on the direction of the motion of coil 25 with respect to the pair of coils along the center line of which the coil 25 is moved.

A battery 35 supplies current for the motor 9, the field of which is connected continuously in circuit, and the armature of which is permanently connected to the neutral tap 36 of the battery and to the positive or negative terminals by means of the armature 37 of a polarized relay engaging with either contact 38 or 39 of the relay, driving the motor forward or reverse under the action of the relay in a manner similar to the action of the contacts 18 and 19 Fig. 1 of the system previously described. A low resistance winding 40 of the relay is connected in series with the filament of the vacuum tube 30 and with the battery 35, and opposes the action of a high resistance relay-winding 41, consisting of many turns of fine wire. This high resistance winding is bridged by a condenser 42 for the purpose of ensuring the smooth action of the relay under the action of a pulsating current, the occurrence of which will be explained. This high resistance winding is connected between the plate of the vacuum tube 30 and one terminal of the A. C. generator 27, the other terminal of the A. C. generator being connected to the filament of the vacuum tube. The high resistance winding may be designed so that the current which it receives from the vacuum tube 30 when the grid potential is zero just balances and neutralizes in effect the current through the low resistance winding 40, thereby permitting the armature 37 to assume a central position out of contact with both contacts 38 and 39. It will be understood by those skilled in the art that the negative of the potential wave applied to the plate of the vacuum tube 30 has no effect on the tube, so it is only necessary to consider the positive portion of the wave.

We have, now, the coil 25 in its neutral position, applying a zero potential to the grid of the vacuum tube; the vacuum tube supplying a small current to the winding 41 of the relay, which is neutralized by the filament current acting in winding 40 of the relay, thus leaving the armature 37 of the relay in its neutral position; and the circuit through the armature of the motor 9 open. Assuming that the coil 25 is moved toward coil 28, for example, a potential is induced in that portion of the circuit without affecting the balance in the circuit of coils 32 and 33. This potential, which may be positive when the plate potential of the vacuum tube is positive, is applied to the grid of the vacuum tube 30, increasing the plate current through the winding 41 of the relay, as will be apparent to one skilled in the art, and causing the relay to operate against the action of the current in winding 40. Armature 37 of the relay is thereby made to engage contact 38, causing motor 9 to operate, which rocks the frame 1 (Fig. 1) until coil 5, Fig. 6, has returned to its neutral position, in the same manner as described in connection with the circuit having the contacts shown in Fig. 1. If the displacement of coil 25 is toward coil 29 the potential applied to the grid of the vacuum tube will be negative during the positive portion of the plate potential wave, decreasing the plate current through winding 41, and permitting the relay to operate under the action of the filament current in winding 40, causing the armature 37 of the relay to engage contact 38, thereby causing armature 37 to engage contact 39. Motor 9 then runs in the opposite direction, which rocks the frame 1 until the secondary coil assembly assumes its central position over coil 25, when the action stops. In a like manner the other portion of the circuit, including the vacuum tube 34 functions under the influence of coils 32 and 33 to cause motor 16 to rotate frame 1 of Fig. 1, about an axis perpendicular to the axis about which motor 9 operates, thereby maintaining the camera or other optical device in its predetermined angular relation to the gyroscope about two axes, in a similar manner to the action of the circuit of Fig. 5 hereinabove described.

It will be noted by those skilled in the art that since the grid of a vacuum tube functions by potential relations without taking current, the only current-flow in the secondary coil assembly 26 is the current due to distributed capacities in the circuit, which current for all practical purposes is so small that it may be considered zero, and since there is substantially no current in said coil assembly 26, there will be no mechanical reaction between it and the coil 25 and consequently no disturbing forces will be applied to the gyroscope.

In accordance with the provisions of the statutes we have described the principles of operation of our invention together with apparatus which we now consider to represent the best embodiment thereof, but we desire to have it understood that the construction shown is only illustrative and that the invention can be carried out by other means within the scope of the appended claim.

What we claim is—

The combination of an aerial camera and a universal support therefor, an erected gyroscope universally mounted in the camera support, and automatic means substantially free from mechanical reaction upon the gyroscope and responsive to relative movement of the camera to maintain the latter in a predetermined orientation with respect to the gyroscope.

In testimony whereof we hereto affix our signatures.

SHERMAN M. FAIRCHILD.
EDMUND R. MORTON.